United States Patent
Lighty et al.

(10) Patent No.: US 12,215,621 B1
(45) Date of Patent: Feb. 4, 2025

(54) HEAT EXCHANGER INLET VANE ASSEMBLIES WITH IMPROVED MIXING TRAILING EDGE FEATURES

(71) Applicant: Rolls-Royce North American Technologies Inc., Indianapolis, IN (US)

(72) Inventors: Kerry J. Lighty, Plainfield, IN (US); William Williamson, Indianapolis, IN (US); Luke Dillard, Indianapolis, IN (US); David Templin, Indianapolis, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 0 days.

(21) Appl. No.: 18/228,266

(22) Filed: Jul. 31, 2023

(51) Int. Cl.
*F02C 7/141* (2006.01)

(52) U.S. Cl.
CPC .......... *F02C 7/141* (2013.01); *F05D 2240/12* (2013.01); *F05D 2250/18* (2013.01); *F05D 2260/213* (2013.01)

(58) Field of Classification Search
None
See application file for complete search history.

(56) References Cited

U.S. PATENT DOCUMENTS

| | | | |
|---|---|---|---|
| 4,203,566 A | 5/1980 | Lord | |
| 4,830,315 A | 5/1989 | Presz, Jr. et al. | |
| 6,050,527 A | 4/2000 | Hebert et al. | |
| 9,249,666 B2 | 2/2016 | Wood et al. | |
| 9,446,475 B2 | 9/2016 | Norfolk et al. | |
| 9,670,901 B2 | 6/2017 | Obrecht et al. | |
| 9,803,546 B2 * | 10/2017 | Willie | F04D 29/584 |
| 10,301,942 B2 | 5/2019 | Joseph et al. | |
| 10,330,104 B2 * | 6/2019 | Son | F04D 29/4226 |
| 10,443,399 B2 | 10/2019 | Jones et al. | |
| 11,137,214 B2 | 10/2021 | Mayberry et al. | |
| 11,162,417 B2 | 11/2021 | Qiu et al. | |
| 11,305,373 B2 | 4/2022 | Mayberry et al. | |
| 2006/0142140 A1 | 6/2006 | White | |
| 2011/0287706 A1 | 11/2011 | Maughan | |
| 2015/0114481 A1 * | 4/2015 | Willie | F02C 7/141 |
| | | | 137/15.1 |
| 2017/0122329 A1 * | 5/2017 | Son | F04D 29/701 |
| 2017/0226865 A1 | 8/2017 | Kray et al. | |
| 2017/0261000 A1 | 9/2017 | Komura et al. | |
| 2021/0041188 A1 | 2/2021 | Walsh et al. | |
| 2024/0059420 A1 * | 2/2024 | Taylor-Tibbott | F02C 7/04 |

FOREIGN PATENT DOCUMENTS

WO  2022129785 A1  6/2022

* cited by examiner

*Primary Examiner* — Juan G Flores
(74) *Attorney, Agent, or Firm* — Barnes & Thornburg LLP

(57) ABSTRACT

A gas turbine engine includes a heat exchanger and an inlet shroud. The heat exchanger is configured to transfer heat. The inlet shroud is configured to be coupled with the heat exchanger upstream of the heat exchanger.

20 Claims, 7 Drawing Sheets

HEAT EXCHANGER INLET VANE ASSEMBLIES WITH IMPROVED MIXING TRAILING EDGE FEATURES

STATEMENT REGARDING FEDERALLY SPONSORED RESEARCH OR DEVELOPMENT

Embodiments of the present disclosure were made with government support under Contract No. FA8650-19-F-2078. The government may have certain rights.

FIELD OF THE DISCLOSURE

The present disclosure relates generally to gas turbine engines, and more specifically to heat-exchanger assemblies in gas turbine engines.

BACKGROUND

Gas turbine engines are used to power aircraft, watercraft, power generators, and the like. Gas turbine engines typically include an engine core having a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Leftover products of the combustion reaction are exhausted out of the turbine and may provide thrust in some applications.

Gas turbine engines also typically include a bypass duct arranged around the engine core. A fan included in the gas turbine engine forces air through the bypass duct and out of an aft end of the gas turbine engine to provide thrust to propel an aircraft. The bypass duct may include components such as struts and vanes that change a direction of the air flowing through the bypass duct. The air flowing through the bypass duct may experience flow separation and a pressure drop as the air passes through various components located in the bypass duct.

SUMMARY

The present disclosure may comprise one or more of the following features and combinations thereof.

A gas turbine engine may comprise a heat exchanger and an inlet shroud. The heat exchanger may be configured to transfer heat from a cooling fluid passing through the heat exchanger to a flow of air received by the heat exchanger. The inlet shroud may be configured to be coupled with the heat exchanger upstream of the heat exchanger. The inlet shroud may include a vane frame and a plurality of inlet turning vanes coupled with the vane frame. The plurality of inlet turning vanes may be configured to direct the flow of air into the heat exchanger. The vane frame may have a first side wall and a second side wall spaced apart from and opposite the first side wall. The first side wall and the second side wall may be both formed to include a first slot having a first chord length and a second slot neighboring the first slot and having a second chord length different from the first chord length. The plurality of inlet turning vanes may be located in the vane frame and may be configured to adjust a direction of the flow of air before the flow of air enters the heat exchanger.

In some embodiments, the plurality of inlet turning vanes may include a first inlet vane and a second inlet vane. The first inlet vane may include a first airfoil body, a first tab, and a second tab. The first inlet vane may have a third chord length. The first tab may extend from a first end of the first airfoil body and into the first slot of the first side wall. The second tab may extend from a second end of the first airfoil body and into the first slot of the second side wall. The second inlet vane may include a second airfoil body, a third tab, and a fourth tab. The second airfoil body may have the third chord length. The third tab may extend from a first end of the second airfoil body and into the second slot of the first side wall. The fourth tab may extend from a second end of the second airfoil body and into the second slot of the second side wall.

In some embodiments, the first inlet vane may have a leading edge and a trailing edge formed to include first notches that extend into the trailing edge of the first inlet vane toward the leading edge of the first inlet vane to increase uniformity of a velocity profile of the flow of air exiting the inlet shroud and entering the heat exchanger. The second inlet vane may have a leading edge and a trailing edge formed to include second notches that extend into the trailing edge of the second inlet vane toward the leading edge of the second inlet vane. The second notches of the second inlet vane may be offset relative to the first notches of the first inlet vane in a spanwise direction of the first inlet vane and the second inlet vane. The first notches of the first inlet vane may be chevron shaped.

In some embodiments, the plurality of inlet turning vanes may include a third inlet vane having a fourth chord length that is less than the third chord length. The third inlet vane may neighbor the first inlet vane to locate the first inlet vane directly between the third inlet vane and the second inlet vane. The third inlet vane may have a leading edge and a trailing edge formed to include third notches that extend into the trailing edge of the third inlet vane toward the leading edge of the third inlet vane. The third notches of the third inlet vane may be offset relative to the first notches of the first inlet vane in the spanwise direction of the first inlet vane and the third inlet vane. The third inlet vane may include a third airfoil body having a first end coupled to the first side wall and a second end coupled to the second side wall.

In some embodiments, the plurality of inlet turning vanes may include a fourth inlet vane having a leading edge and a continuous trailing edge formed without notches. The fourth inlet vane may include a fourth airfoil body having a first end coupled to the first side wall and a second end coupled to the second side wall.

In some embodiments, the plurality of inlet turning vanes may include a third inlet vane having a leading edge and a continuous trailing edge formed without notches. The third inlet vane may include a third airfoil body having a first end coupled to the first side wall and a second end coupled to the second side wall. The third inlet vane may be the axially forwardmost vane of the plurality of inlet turning vanes.

According to another aspect of the present disclosure, a gas turbine engine may comprise a heat exchanger and an inlet shroud. The heat exchanger may be configured to transfer heat from a cooling fluid passing through the heat exchanger to a flow of air received by the heat exchanger. The inlet shroud may be configured to be coupled with the heat exchanger upstream of the heat exchanger. The inlet shroud may include a vane frame and a plurality of inlet turning vanes coupled with the vane frame and configured to direct the flow of air into the heat exchanger. The vane frame may have a first side wall and a second side wall spaced apart from and opposite the first side wall. The plurality of inlet turning vanes may be located in the vane frame and configured to adjust a direction of the flow of air before the flow of air enters the heat exchanger.

In some embodiments, the plurality of inlet turning vanes may include a first inlet vane and a second inlet vane. The first inlet vane may include a first airfoil body having a first chord length. A first end of the first airfoil body may be coupled to the first side wall. A second end of the first airfoil body may be coupled to the second side wall. The second inlet vane may include a second airfoil body having the first chord length. A first end of the second airfoil body may be coupled to the first side wall. A second end of the second airfoil body may be coupled to the second side wall.

In some embodiments, the first inlet vane may have a leading edge and a trailing edge opposite the leading edge. The first inlet vane may be formed to include first ribs extending between the leading edge and the trailing edge. The second inlet vane may have a leading edge and a trailing edge opposite the leading edge. The second inlet vane may be formed to include second ribs extending between the leading edge and the trailing edge.

In some embodiments, the first inlet vane may have a leading edge and a trailing edge formed to include first notches that extend into the trailing edge of the first inlet vane toward the leading edge of the first inlet vane to increase uniformity of a velocity profile of the flow of air exiting the inlet shroud and entering the heat exchanger. The first inlet vane may be formed to include first ribs extending between the leading edge and the trailing edge of the first inlet vane.

In some embodiments, the second inlet vane may have a leading edge and a trailing edge formed to include second notches that extend into the trailing edge of the second inlet vane toward the leading edge of the second inlet vane. The second notches of the second inlet vane may be offset relative to the first notches of the first inlet vane in a spanwise direction of the first inlet vane and the second inlet vane. The second inlet vane may be formed to include second ribs extending between the leading edge and the trailing edge of the second inlet vane.

In some embodiments, the first side wall and the second side wall of the vane frame may be both formed to include a first slot having a second chord length and a second slot neighboring the first slot and having a third chord length different from the second chord length. The first end of the first airfoil body of the first inlet vane may be formed to include a first tab extending from the first end into the first slot of the first side wall. The second end of the first airfoil body of the first inlet vane may be formed to include a second tab extending from the second end into the first slot of the second side wall. The first end of the second airfoil body of the second inlet vane may be formed to include a third tab extending from the first end into the second slot of the first side wall. The second end of the second airfoil body of the second inlet vane may be formed to include a fourth tab extending from the second end into the second slot of the second side wall. The inlet shroud may be integrally formed.

A method may comprise providing a heat exchanger. The method may comprise arranging an inlet shroud upstream of the heat exchanger. The inlet shroud may include a vane frame and a plurality of inlet turning vanes including a first inlet vane and a second inlet vane. The vane frame may have a first side wall and a second side wall spaced apart from and opposite the first side wall. The first side wall and the second side wall may both be formed to include a first slot and a second slot neighboring the first slot. The method may comprise inserting a first tab extending from a first end of the first inlet vane into the first slot of the first side wall. The method may comprise inserting a second tab extending from a second end of the first inlet vane into the first slot of the second side wall. The method may comprise inserting a third tab extending from a first end of the second inlet vane into the second slot of the first side wall. The method may comprise inserting a fourth tab extending from a second end of the second inlet vane into the second slot of the second side wall.

In some embodiments, the method may comprise directing a flow of air through the inlet shroud. The method may comprise adjusting a direction of the flow of air via the plurality of inlet turning vanes before the flow of air enters the heat exchanger. The method may include stamping first notches in a trailing edge of the first inlet vane formed of sheet metal and stamping second notches in a trailing edge of the second inlet vane formed of sheet metal. The method may include brazing the first tab of the first inlet vane with the first slot of the first side wall, brazing the second tab of the first inlet vane with the first slot of the second side wall, brazing the third tab of the second inlet vane with the second slot of the first side wall, and brazing the fourth tab of the second inlet vane with the second slot of the second side wall.

These and other features of the present disclosure will become more apparent from the following description of the illustrative embodiments.

DETAILED DESCRIPTION OF THE DRAWINGS

Figure 1:
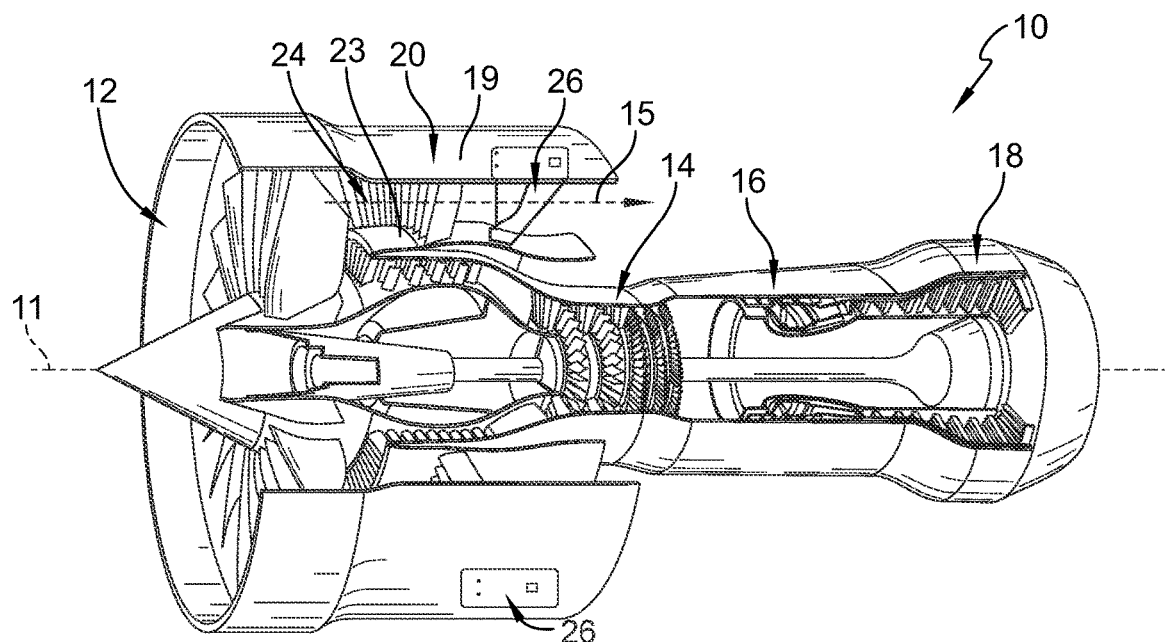
FIG. 1 is a cutaway view of a gas turbine engine that includes an engine core having a compressor, a combustor downstream of the compressor, and a turbine downstream of the combustor, and further including a fan driven by the engine core, a bypass duct arranged around the fan and the engine core, and a heat-exchanger assembly located in the bypass duct.

For the purposes of promoting an understanding of the principles of the disclosure, reference will now be made to a number of illustrative embodiments illustrated in the drawings and specific language will be used to describe the same.

An illustrative gas turbine engine 10 includes a fan assembly 12, a compressor 14, a combustor 16 located downstream of the compressor 14, and a turbine 18 located downstream of the combustor 16 as shown in FIG. 1. The fan assembly 12 is driven by the turbine 18 and provides thrust for propelling the gas turbine engine 10 by forcing air 15 through a bypass duct 20. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about a central axis 11 and drive the compressor 14 and the fan assembly 12.

The fan assembly 12 rotates about the central axis 11 to force the air 15 through a flow path 24 such that the air 15 is directed through the bypass duct 20 to provide thrust to propel the gas turbine engine 10. The air 15 is ambient air and has a temperature that is less than the hot, high-pressure products of the combustion reaction experienced by the combustor 16 and turbine 18. As such, a portion of the air 15 is used as a cold sink source in the present disclosure and used to cool oil, fuel, water, refrigerant, etc. for cooling the turbine 18 and/or other components such as electronics, motors, generators, etc.

Figure 2:
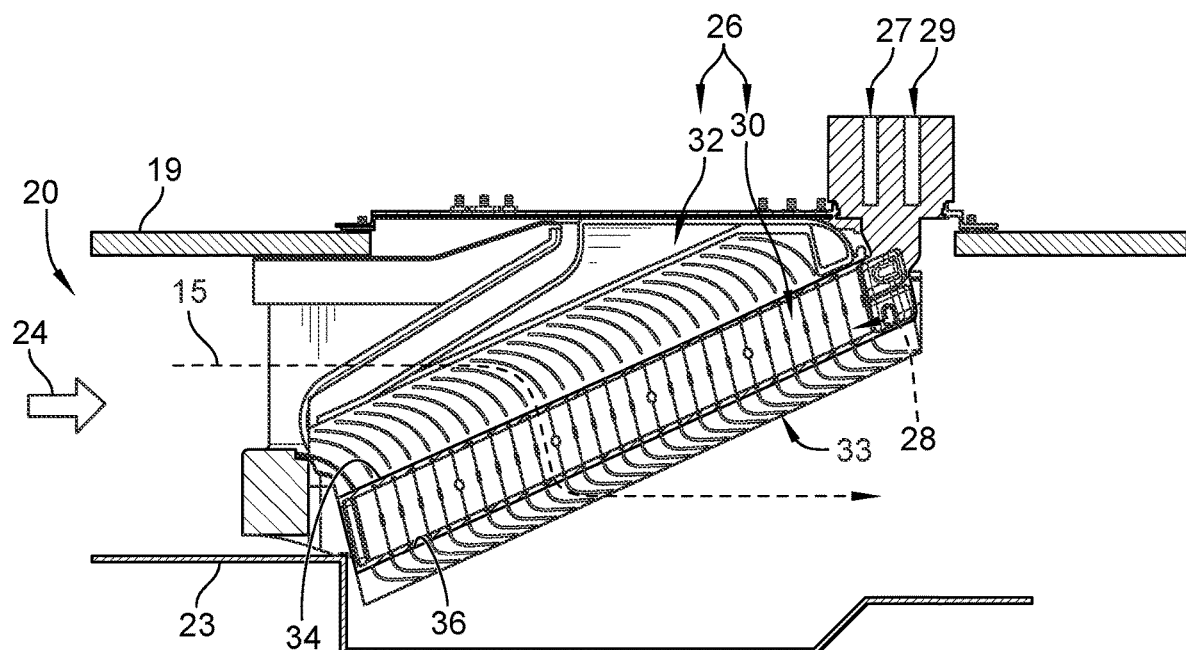
FIG. 2 is a section view of the bypass duct of the gas turbine engine of FIG. 1, showing the heat-exchanger assembly is arranged in the bypass duct and includes an inlet shroud having a plurality of inlet turning vanes, a heat exchanger coupled to the inlet shroud downstream of the inlet shroud, and an outlet shroud having a plurality of outlet vanes whereby the inlet vanes and the outlet vanes help direct a flow of air through the heat exchanger while minimizing flow separation and pressure loss.

The bypass duct 20 is arranged circumferentially around the central axis 11 and includes an outer wall 19 and an inner wall 23 as shown in FIGS. 1 and 2. The outer wall 19 defines a radially outer boundary of the flow path 24 of the bypass duct 20. The inner wall 23 defines a radially inner boundary of the flow path 24 of the bypass duct 20.

The gas turbine engine 10 further includes a heat-exchanger assembly 26 located in the bypass duct 20 as shown in FIGS. 1 and 2. A portion of the air 15 flowing through the flow path 24 passes through the heat-exchanger assembly 26, and the heat-exchanger assembly 26 transfers heat from a fluid 28 passing through the heat-exchanger assembly 26 to the air 15. The fluid 28 may be for example, oil, fuel, water, refrigerant, etc. The gas turbine engine 10 includes a plurality of heat-exchanger assemblies 26 spaced apart from one another circumferentially as suggested in FIG. 1. As such, each heat-exchanger assembly 26 is discrete axially and circumferentially and does not extend fully around the central axis 11. In other embodiments, the gas turbine engine 10 may include a single heat-exchanger assembly 26.

The heat-exchanger assembly 26 includes, among other things, a heat exchanger 30, an inlet shroud 32, and an outlet shroud 33, which may also be referred to as an outlet vane box 33, as shown in FIG. 2. The heat exchanger 30 is coupled to the inlet shroud 32 downstream of the inlet shroud 32. The heat exchanger 30 is configured to receive the portion of the air 15 flowing through the bypass duct 20 and transfer heat from the heat-exchanger assembly 26 to the air 15 to cool the fluid 28 within the heat exchanger 30. The inlet shroud 32 alters a direction of the air 15 to flow into the heat exchanger 30 at a desired angle and improve uniformity of pressure and speed of the air entering the heat exchanger 30. The outlet shroud 33 alters a direction of the air 15 exiting the heat exchanger 30 to redirect the air 15 primarily in the axially aft direction.

The heat exchanger 30 includes a first wall 34, which may be an upstream face of the heat exchanger 30, and a second wall 36, which may be a downstream face of the heat exchanger 30, as shown in FIG. 2. The second wall 36 is spaced apart from and opposite the first wall 34. The first wall 34, which may be the upstream face of the heat exchanger 30, is coupled with the inlet shroud 32 and the second wall 36, which may be the downstream face of the heat exchanger 30, is coupled with the outlet shroud 33. The heat exchanger 30 includes a flow path located adjacent the first wall 34 and the second wall 36. In the illustrative embodiment, the fluid 28 flows into an inlet 27 through the outer wall 19, into the flow path axially forward, turns and returns axially aft to an outlet 29 through the outer wall 19. In other embodiments, alternative inlet, outlet, and flow paths may be used.

The heat exchanger 30 extends at an angle relative to the central axis 11 as shown in FIG. 2. The heat exchanger 30 extends radially inward and axially forward from the outer wall 19. The heat exchanger 30 extends radially entirely between the outer wall 19 and the inner wall 23 such that the bypass duct 20 is blocked radially by the heat exchanger 30, though it will be understood that another portion of the air 15 not flowing through the heat-exchanger assembly 26 flows around sides of heat-exchanger assembly 26.

Figure 3:
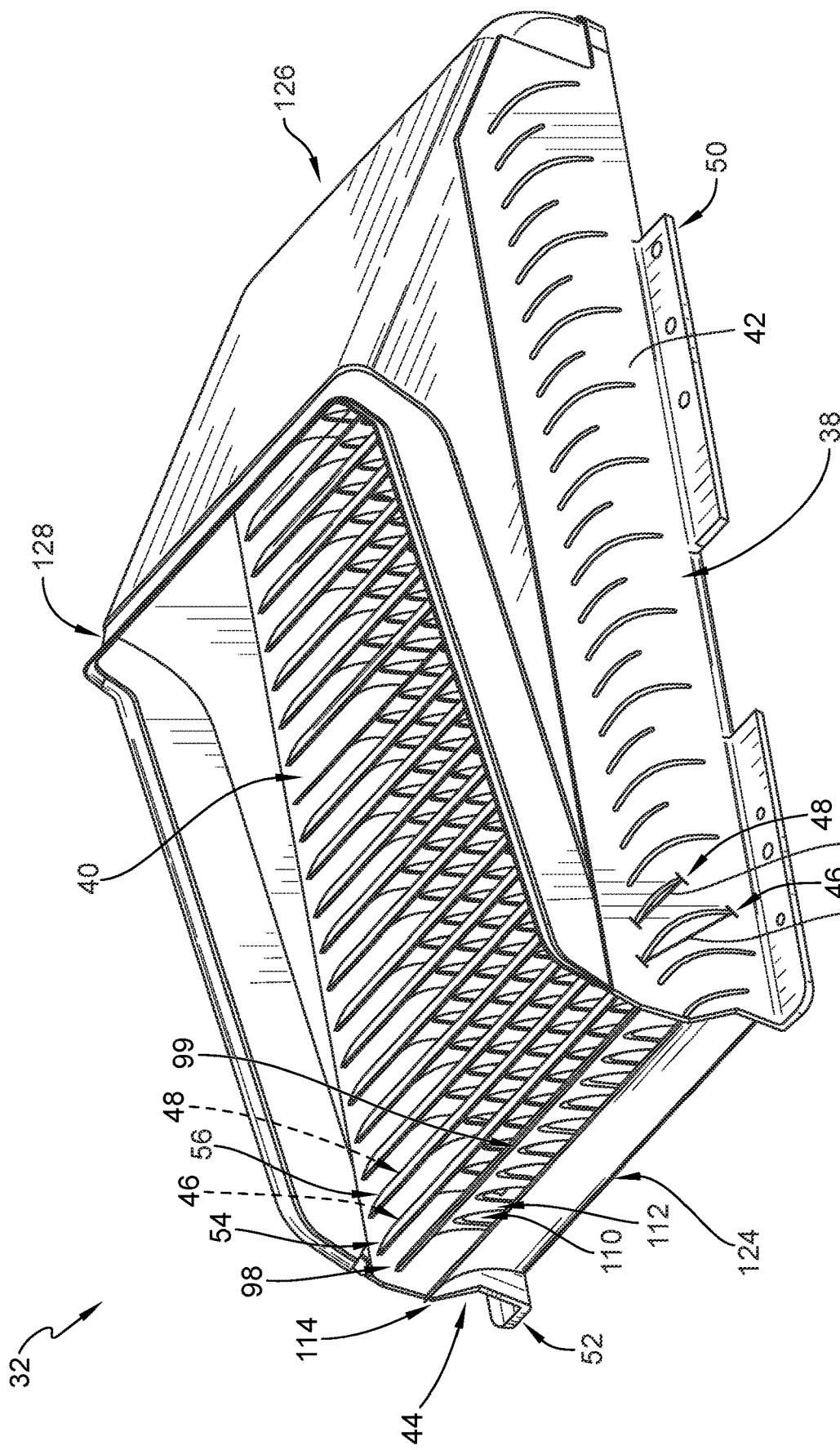
FIG. 3 is a perspective view of the inlet shroud of FIG. 2, showing the inlet shroud includes a vane frame and the plurality of inlet turning vanes coupled with the vane frame and configured to adjust a direction of the flow of air, the vane frame has a first side wall and a second side wall spaced apart from and opposite the first side wall, and the first side wall and the second side wall are both formed to include a first slot having a first chord length and a second slot neighboring the first slot and having a second chord length that is different from the first chord length.

The inlet shroud 32 of the heat-exchanger assembly 26 includes a vane frame 38 and a plurality of inlet turning vanes 40 as shown in FIG. 3. The plurality of inlet turning vanes 40 are located within the vane frame 38 and are configured to adjust a direction of the portion of the air 15 entering the heat exchanger 30. The plurality of inlet turning vanes 40 turn the portion of air 15 by adjusting a direction of the flow of the air 15 such that the air 15 enters the heat exchanger 30 in a direction normal to an upstream surface of the first wall 34 of the heat exchanger 30 in the illustrative embodiment.

The vane frame 38 of the inlet shroud 32 is coupled with the first wall 34 of the heat exchanger 30, such as the upstream surface of the first wall 34, as suggested in FIG. 2. The vane frame 38 includes a first side wall 42 and a second side wall 44 spaced apart from and opposite the first side wall 42 in a spanwise direction of the plurality of inlet turning vanes 40.

The first side wall 42 and the second side wall 44 of the vane frame 38 are both formed to include a plurality of slots as shown in FIG. 3. The plurality of slots includes a first slot 46 and a second slot 48 neighboring the first slot 46 as shown in FIG. 3. The first slot 46 has a first chord length C1. The second slot 48 has a second chord length C2. The first chord length C1 is different from the second chord length C2. In the illustrative embodiment, the first chord length C1 is greater than the second chord length C2.

The first slot 46 formed in the first side wall 42 is aligned with the first slot 46 formed in the second side wall 44 as shown in FIG. 3. The second slot 48 formed in the first side wall 42 is aligned with the second slot 48 formed in the second side wall 44. The first side wall 42 and the second side wall 44 are both formed to include the plurality of slots which includes additional first slots 46 and additional second slots 48 as shown in FIG. 3. The additional first slots 46 and the additional second slots 48 are arranged in an alternating pattern along the first side wall 42 and the second side wall 44 such that the additional first slots 46 are neighbored on both sides by additional second slots 48.

The vane frame 38 further includes a first flange 50 and a second flange 52 as shown in FIG. 3. The first flange 50 and the second flange 52 couple the vane frame 38 with the first wall 34 of the heat exchanger 30, such as the upstream surface of the first wall 34. The first flange 50 extends outwardly away from the first side wall 42 as shown in FIG. 3. In the illustrative embodiment, the first side wall 42 and the first flange 50 are substantially perpendicular to each other. In illustrative embodiments, the first flange 50 includes a front flange portion and an aft flange portion. In some embodiments, the first flange 50 is formed as a single component extending outwardly away from the first side wall 42. The second flange 52 extends outwardly away from the second side wall 44 as shown in FIG. 3. In the illustrative embodiment, the second side wall 44 and the second flange 52 are substantially perpendicular to each other. In illustrative embodiments, the second flange 52 includes a front flange portion and an aft flange portion. In some embodiments, the second flange 52 is formed as a single component extending outwardly away from the second side wall 44.

Figure 4:
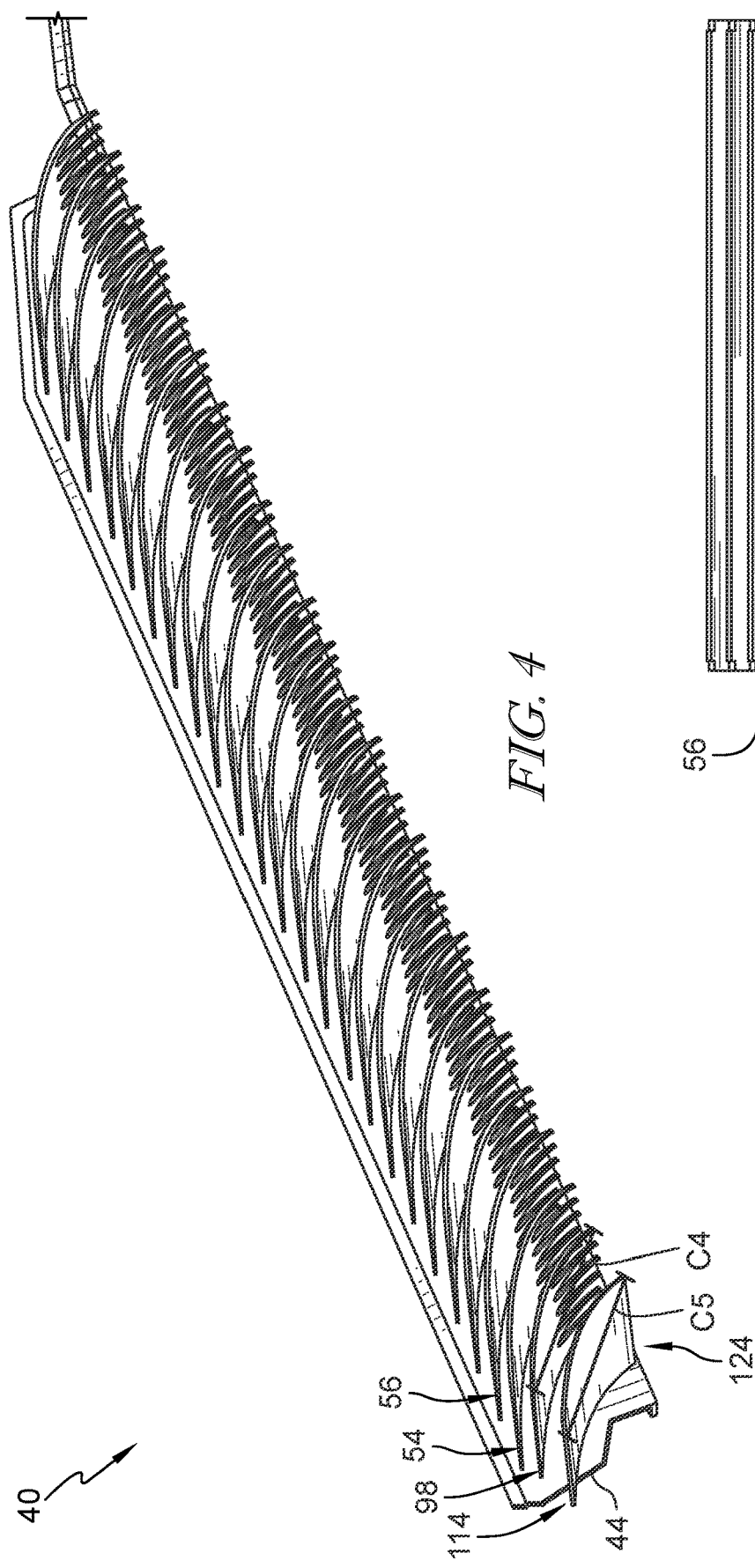
FIG. 4 is a perspective view of a portion of the inlet shroud of FIG. 3 with the first side wall of the vane frame removed, showing the plurality of inlet turning vanes includes a first inlet vane and a second inlet vane, the first and second inlet vanes each have a leading edge and a trailing edge, the trailing edge is formed to include notches that extend into the trailing edge toward the leading edge, and the plurality of inlet turning vanes further includes a third inlet vane having a leading edge and a trailing edge formed as a continuous trailing edge without notches.

The plurality of inlet turning vanes 40 of the inlet shroud 32 are located in and coupled with the vane frame 38 as shown in FIGS. 3 and 4. The plurality of inlet turning vanes 40 includes a set of first inlet vanes 54 and a set of second inlet vanes 56 alternating and neighboring the first inlet vanes 54. Each of the first inlet vanes 54 are substantially similar and each of the second inlet turning vanes 56 are substantially similar. As such, only one first inlet vane 54 and one second inlet vane 56 are described below.

Figure 6:
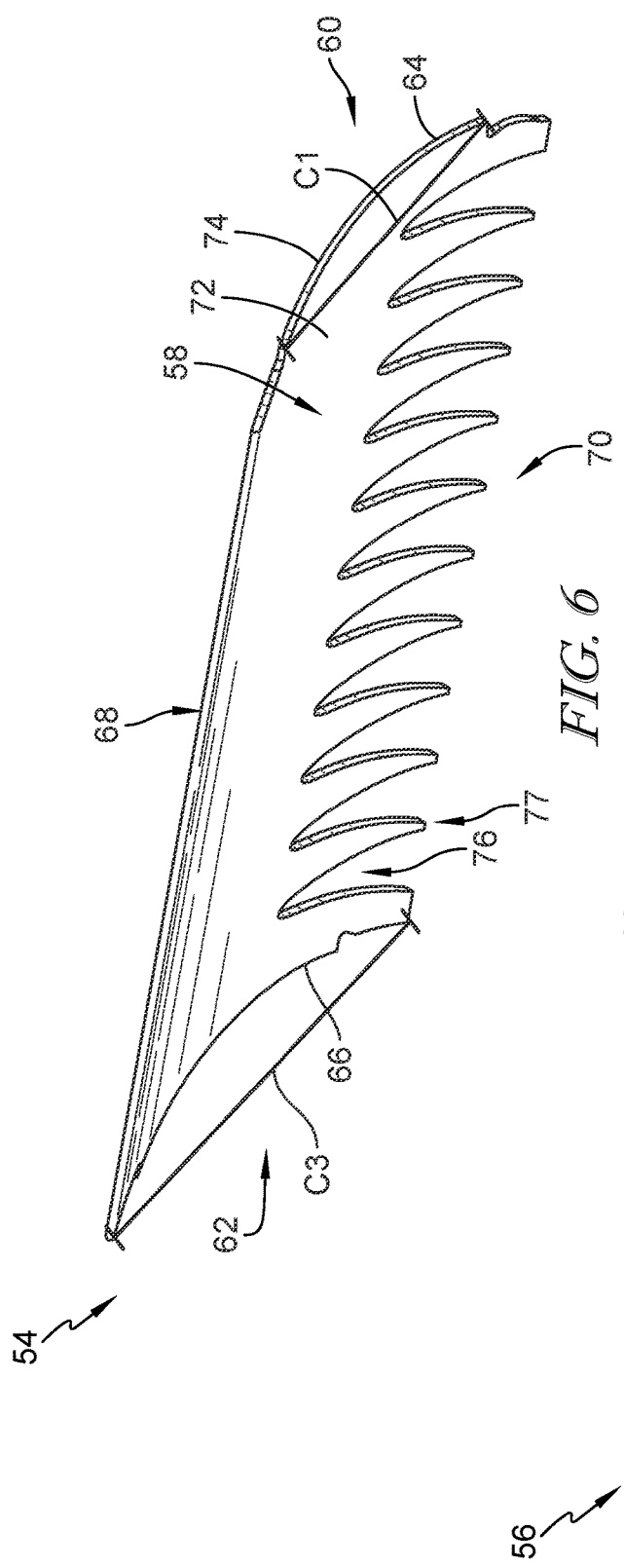
FIG. 6 is an enlarged perspective view of the first inlet vane of FIG. 5, showing the first inlet vane includes a first airfoil body, a first tab extends from a first end of the first airfoil body and is configured to extend into the first slot of the first side wall shown in FIG. 3, and a second tab extends from a second end of the first airfoil body and is configured to extend into the first slot of the second side wall.

The first inlet vane 54 includes a first airfoil body 58 having a first end 60 and a second end 62 spaced apart span wise from the first end 60 as shown in FIG. 6. The first airfoil body 58 has a third chord length C3 as shown in FIG. 6. The third chord length C3 is greater than the first chord length C1 and the second chord length C2. A first tab 64 extends from the first end 60 of the first airfoil body 58. A second tab 66 extends from the second end 62 of the first airfoil body 58. The first tab 64 and the second tab 66 couple the first inlet vane 54 with the first side wall 42 and the second side wall 44 of the vane frame 38.

The first tab 64 of the first airfoil body 58 of the first inlet vane 54 extends into the first slot 46 of the first side wall 42 as shown in FIG. 3. A chord length of the first tab 64 is substantially similar to the first chord length C1 of the first slot 46 as the first tab 64 fits within the first slot 46 as shown in FIGS. 3 and 6. The second tab 66 is configured to extend into the first slot 46 of the second side wall 44. A chord length of the second tab 66 is substantially similar to the first chord length C1 of the first slot 46 as the second tab 66 fits within the first slot 46. The chord length of the first tab 64 is substantially similar to the chord length of the second tab 66.

The first inlet vane 54 further includes a leading edge 68, a trailing edge 70, a pressure side 72, and a suction side 74 as shown in FIG. 6. The pressure side 72 of the first inlet vane 54 extends between the leading edge 68 and the trailing edge 70. The suction side 74 extends between the leading edge 68 and the trailing edge 70 on an opposing side of the first inlet vane 54. In the illustrative embodiment, the first inlet vane 54 has a substantially continuous thickness from leading edge 68 to trailing edge 70. For example, the first inlet vane 54 may be formed from a sheet of material and formed into the curved vane shape without substantially altering the thickness of the sheet. In other embodiments, the first inlet vane 54 has an airfoil shaped cross section.

Figure 7:
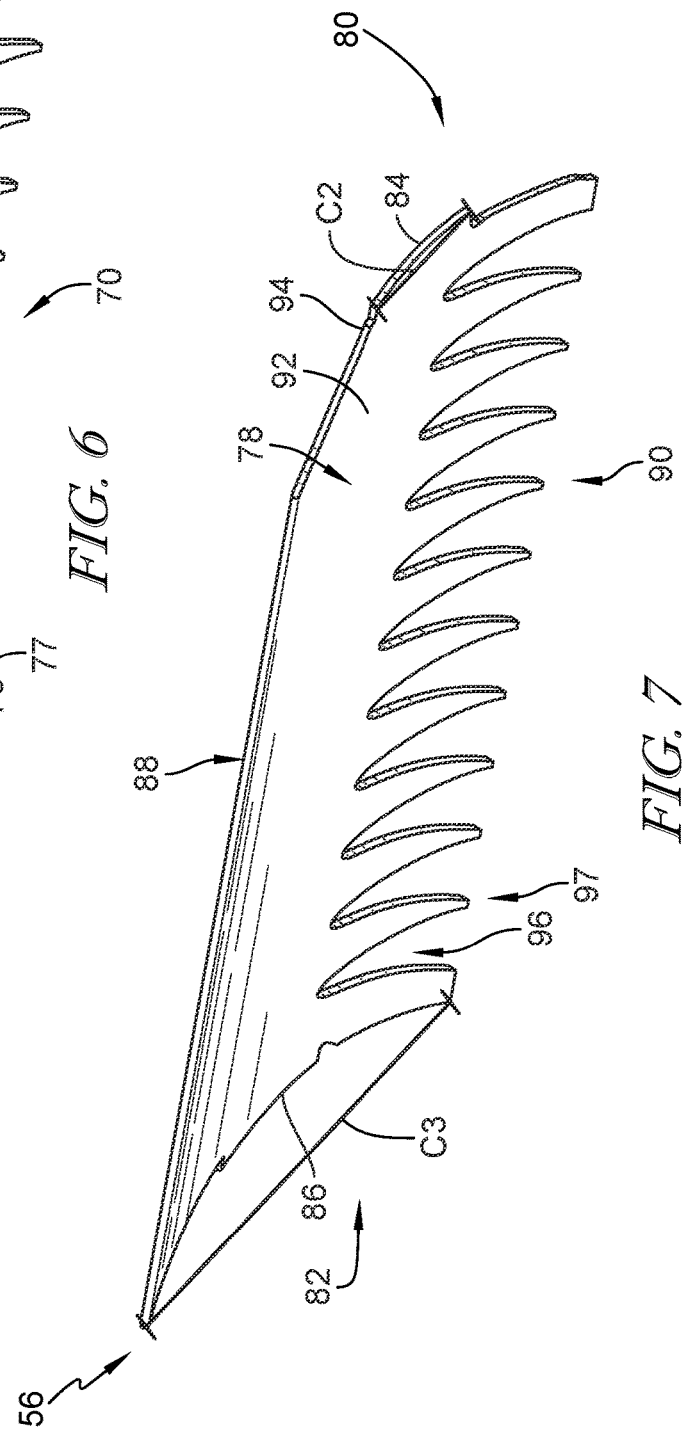
FIG. 7 is an enlarged view of the second inlet vane of FIG. 5, showing the second inlet vane includes a second airfoil body, a third tab extends from a first end of the second airfoil body and is configured to extend into the second slot of the first side wall shown in FIG. 3, a fourth tab extends from a second end of the second airfoil body and is configured to extend into the second slot of the second side wall, and the first tab and the second tab of the first inlet vane, as shown in FIG. 6, have a chord length different than a chord length of the third tab and the fourth tab of the second inlet vane as shown in FIG. 7.

Due to size constraints of the bypass duct 20, the plurality of inlet turning vanes 40 may turn the air 15 in a relatively short distance. Thus, the air 15 may be turned at a relatively large angle by the plurality of inlet turning vanes 40, which have a relatively short chord length. The plurality of inlet turning vanes 40 turn and mix the air 15 so that the air 15 enters the heat exchanger 30 with a uniform velocity. Separation may occur wherein the air 15 separates from the suction side 74, 94 of each of the plurality of inlet turning vanes 40. In some embodiments of the disclosure, the plurality of inlet turning vanes 40 are formed to includes notches 76, 96 in each of the trailing edges 70, 90 that improve mixing of the air 15, and thus, heat exchanger performance as shown in FIGS. 6 and 7. Mixing of the air 15 through the notches 76, 96 allows the air 15 flowing on the pressure side 72, 92 of each of the plurality of inlet turning vanes 40 to mix with the air 15 flowing on the suction side 74, 94 of each of the plurality of inlet turning vanes 40. The mixing provides a more desirable air 15 flow direction and velocity profile entering the heat exchanger 30. The uniform velocity of the air 15 as the air 15 enters the heat exchanger 30 may increase the heat transfer capability and efficiency of the heat exchanger 30, reduce the total pressure loss through the heat exchanger 30, and minimize heat transfer degradation in the heat exchanger 30. In other embodiments, the trailing edges 70, 90 of all of the plurality of inlet turning vanes 40 are continuous and not formed with the notches 76, 96.

The trailing edge 70 of the first inlet vane 54 is formed to include first notches 76 that extend into the trailing edge 70 of the first inlet vane 54 partway toward the leading edge 68 of the first inlet vane 54 as shown in FIG. 6. The first notches 76 may increase uniformity of a velocity profile of the flow of air 15 exiting the inlet shroud 32 and entering the heat exchanger 30 as suggested in FIG. 8. The first notches 76 are generally chevron shape.

The trailing edge 70 of the first inlet vane 54 is further formed to include first tips 77 between the first notches 76 as shown in FIG. 6. The first tips 77 and the first notches 76 are formed along an entirety of the trailing edge 70 of the first inlet vane 54 in the spanwise direction. In alternative embodiments, the first tips 77 and the first notches 76 are formed along at least part of the trailing edge 70 of the first inlet vane 54 in the spanwise direction.

The second inlet vane 56 includes a second airfoil body 78 having a first end 80 and a second end 82 spaced apart spanwise from the first end 80 as shown in FIG. 7. The second inlet vane 56 neighbors the first inlet vane 54 in the vane frame 38 as shown in FIGS. 3 and 4. The second airfoil body 78 has the third chord length C3 as shown in FIG. 6. Thus, the third chord length C3 of the first airfoil body 58 is the same as the third chord length C3 of the second airfoil body 78. A third tab 84 extends from the first end 80 of the second airfoil body 78. A fourth tab 86 extends from the second end 82 of the second airfoil body 78. The third tab 84 and the fourth tab 86 couple the second inlet vane 56 with the first side wall 42 and the second side wall 44 of the vane frame 38.

The third tab 84 of the second airfoil body 78 of the second inlet vane 56 extends into the second slot 48 of the first side wall 42 as shown in FIG. 3. A chord length of the third tab 84 is substantially similar to the second chord length C2 of the second slot 48 as the third tab 84 fits within the second slot 48.

The fourth tab 86 is configured to extend into the second slot 48 of the second side wall 44 as suggested in FIG. 3. A chord length of the fourth tab 86 is substantially similar to the second chord length C2 of the second slot 48 as the fourth tab 86 fits within the second slot 48. The chord length of the third tab 84 is substantially similar to the chord length of the fourth tab 86.

The first tab 64 and the second tab 66 of the first inlet vane 54 have a chord length substantially similar to the first chord length C1 of the first slot 46, while the third tab 84 and the fourth tab 86 of the second inlet vane 56 have a chord length substantially similar to the second chord length C2 of the second slot 48. The different tab and slot chord lengths allow the first inlet vane 54 and the second inlet vane 56 to be placed into the vane frame 38 in an alternating order. Because the first slot 46 with the first chord length C1 and the second slot 48 with the second chord length C2 are formed on both the first side wall 42 and the second side wall 44 in an alternating order, the first inlet vane 54 and the second inlet vane 56 are placed within the vane frame 38 in an alternating order.

Figure 5:
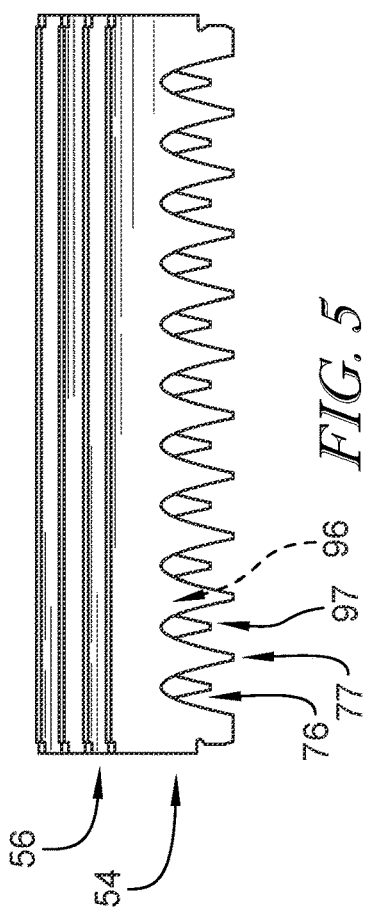
FIG. 5 is an enlarged view of the plurality of inlet turning vanes of FIG. 4, showing the notches formed in the trailing edge of the first inlet vane are offset in a spanwise direction relative to the notches formed in the trailing edge of the second inlet vane.

The first tab 64 and the second tab 66 of the first inlet vane 54 fit within the first slot 46 of the first side wall 42 and the second side wall 44, but do not fit within the second slot 48 of the first side wall 42 and the second side wall 44. Likewise, the third tab 84 and the fourth tab 86 of the second inlet vane 56 fit within the second slot 48 of the first side wall 42 and the second side wall 44, but do not fit within the first slot 46 of the first side wall 42 and the second side wall 44. Thus, the different tab and slot chord lengths allow for proper installation of the first inlet vane 54 and the second inlet vane 56 into the vane frame 38. This may be helpful to maintain the alternating offset of tips 77, 97 as shown in FIG. 5. The first slot 46 and the second slots 48 also help to maintain an airfoil shape of the first airfoil body 58 and the second airfoil body 78, respectively.

The second inlet vane 56 further includes a leading edge 88, a trailing edge 90, a pressure side 92, and a suction side 94 as shown in FIG. 7. The pressure side 92 of the second inlet vane 56 extends between the leading edge 88 and the trailing edge 90. The suction side 94 extends between the leading edge 88 and the trailing edge 90 on an opposing side of the second inlet vane 56. In the illustrative embodiment, the second inlet vane 56 has a substantially continuous thickness from leading edge 88 to trailing edge 90. In other embodiments, the second inlet vane 56 has an airfoil shaped cross section.

Figure 8:
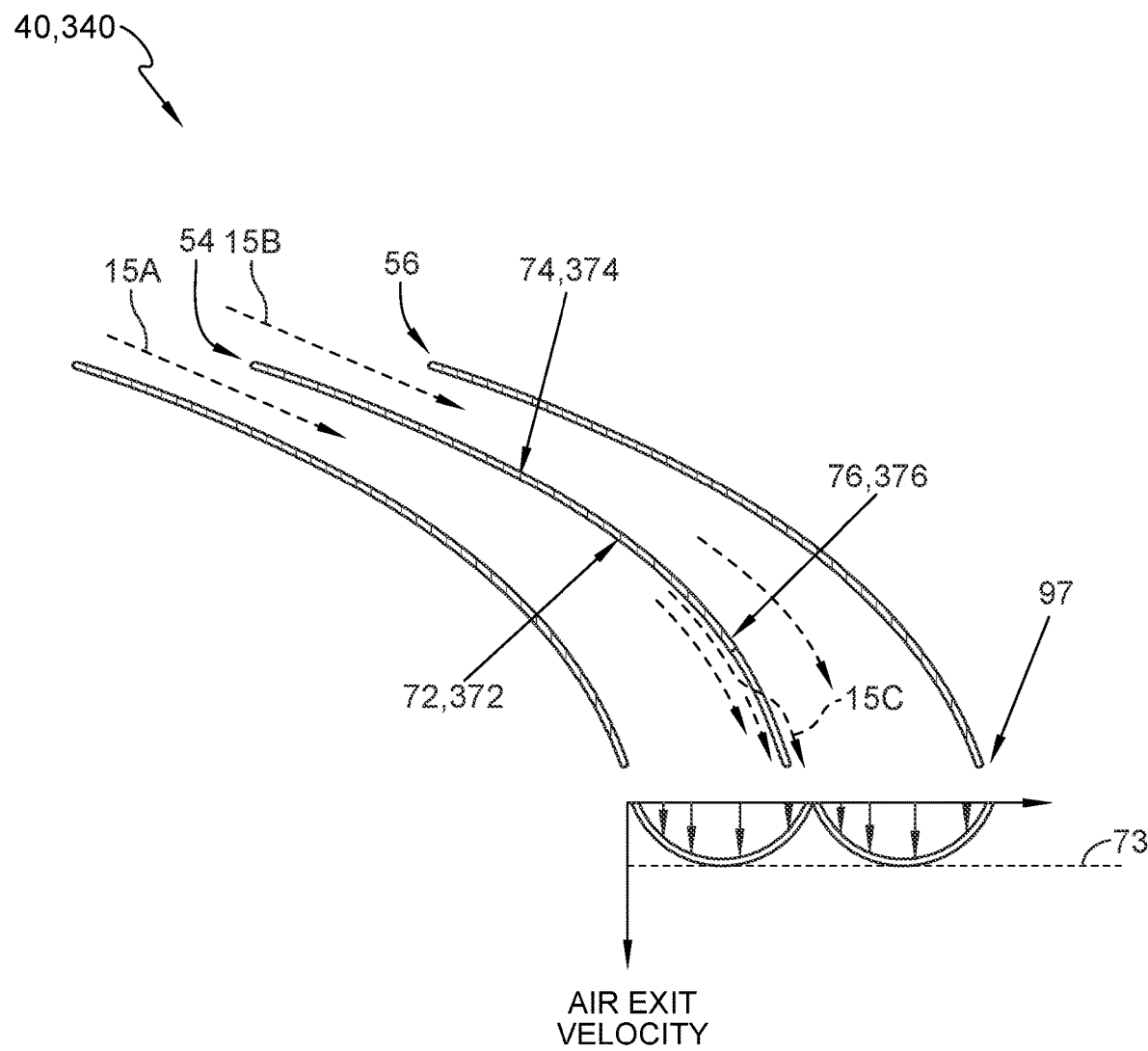
FIG. 8 is a velocity profile of the flow of air through the plurality of inlet turning vanes of FIG. 3 and FIG. 11, showing that the notches formed in the trailing edge of the first inlet vane and the second inlet vane increase a uniformity of the velocity profile of the flow of air exiting the inlet shroud and entering the heat exchanger.

In the illustrative embodiment, the trailing edge 90 of the second inlet vane 56 is formed to include second notches 96 that extend partway into the trailing edge 90 of the second inlet vane 56 toward the leading edge 88 of the second inlet vane 56 as shown in FIG. 7. The second notches 96 may increase uniformity of the velocity profile of the flow of air 15 exiting the inlet shroud 32 and entering the heat exchanger 30 as shown in FIG. 8. The second notches 96 are generally chevron shape.

The first notches 76 formed in the trailing edge 70 of the first inlet vane 54 have a shape, and the second notches 96 formed in the trailing edge 90 of the second inlet vane 56 have a shape as shown in FIGS. 6 and 7. The shape of the first notches 76 is substantially similar to the shape of the second notches 96. In the illustrative embodiment, the shape of both the first notches 76 and the second notches 96 is a chevron shape. In other embodiments, the shape of the first notches 76 and the second notches 96 may be an alternative shape.

The trailing edge 90 of the second inlet vane 56 is further formed to include second tips 97 between the second notches 96 as shown in FIG. 7. The second tips 97 and the second notches 96 are formed along an entirety of the trailing edge 90 of the second inlet vane 56 in the spanwise direction. In alternative embodiments, the second tips 97 and the second notches 96 are formed along at least part of the trailing edge 90 of the second inlet vane 56 in the spanwise direction.

The second notches 96 of the second inlet vane 56 are offset relative to the first notches 76 of the first inlet vane 54 in a spanwise direction of the first inlet vane 54 and the second inlet vane 56 as shown in FIG. 5. The offset pattern, which may also be referred to as a staggered pattern, of the notches 76, 96 promotes further mixing of the air 15, in addition to the mixing of the air 15 flowing on the pressure side 72, 92 of each of the plurality of inlet turning vanes 40 and through the notches 76, 96 to mix with the air 15 flowing on the suction side 74, 94 of each of the plurality of inlet turning vanes 40. Thus, the offset pattern of the notches 76, 96 promotes additional mixing of the air 15 along a lengthwise direction of the heat exchanger 30. The first tips 77 of the first inlet vane 54 are aligned spanwise with the second notches 96 formed in the trailing edge 90 of the second inlet vane 56 as shown in FIG. 5. The first notches 76 of the first inlet vane 54 are aligned spanwise with the second tips 97 formed in the trailing edge 90 of the second inlet vane 56.

The air 15 flowing through the flow path 24 of the bypass duct 20 enters the inlet shroud 32 as suggested in FIG. 8. A first part 15A of the air 15 flows on the pressure side 72 of the first inlet vane 54 and a second part 15B of the air 15 flows on the suction side 74 of the first inlet vane 54 (and on the pressure side of the second inlet vane 56) as suggested in FIG. 8. A portion 15C of the first part 15A of the air 15 flowing on the pressure side 72 of the first inlet vane 54 flows through the first notches 76 formed on the trailing edge 70 of the first inlet vane 54. The portion 15C of the first part of the air 15 mixes with the second part 15B of the air 15 flowing on the suction side 74 of the first inlet vane 54.

The mixing of the portion 15C of the first part 15A of the air 15 from the pressure side 72 with the second part 15B of the air 15 from the suction side 74 of the first inlet vane 54 may increase the uniformity of the velocity profile of the air 15 exiting the inlet shroud 32 and entering the heat exchanger 30 as suggested in FIG. 8. In particular, a peak 73 of the velocity profile may be relatively lower and closer to an average velocity of the air 15 as compared to other embodiments, as suggested, for example, in FIG. 10. Additionally, the notches 76, 96 may reduce or eliminate areas of reverse flow as suggested in FIG. 8 showing no reverse flow as compared to the example flow of FIG. 10 which suggests a scenario with some reverse flow.

At the first tips 77 of the first inlet vane 54, another portion of the first part 15A of the air 15 flowing on the pressure side 72 of the first inlet vane 54 flows along the first tips 77. Thus, the first and second notches 76, 96 of the first and second inlet vanes 54, 56 maintain the uniform flow of the air 15, which may increase the heat transfer capability of the heat exchanger 30, reduce total pressure loss through the heat exchanger 30, and minimize heat transfer degradation in the heat exchanger 30.

The plurality of inlet turning vanes 40 further includes a third inlet vane 98 located as the second axially forwardmost inlet turning vane 40 as shown in FIGS. 3 and 4. The third inlet vane 98 includes a third airfoil body 99 having a fourth chord length C4 that is less than the third chord length C3 of the first inlet vane 54 and the second inlet vane 56 due to the profile of incoming air and the space claim in the bypass duct. The third inlet vane 98 neighbors the first inlet vane 54 to locate the first inlet vane 54 directly between the third inlet vane 98 and the second inlet vane 56. The third airfoil body 99 of the third inlet vane 98 has a first end coupled to the first side wall 42 and a second end coupled to the second side wall 44 as shown in FIG. 3.

The trailing edge of the third inlet vane 98 is formed to include third notches 110 that extend into the trailing edge of the third inlet vane 98 toward the leading edge of the third inlet vane 98 as shown in FIGS. 3 and 4. The trailing edge of the third inlet vane 98 is further formed to include third tips 112 that define the third notches 110 as shown in FIG. 3. The third notches 110 of the third inlet vane 98 are offset relative to the first notches 76 of the first inlet vane 54 in a spanwise direction. The third notches 110 of the third inlet vane 98 are aligned with the second notches 96 of the second inlet vane 56. The third tips 112 of the third inlet vane 98 are aligned spanwise with the first notches 76 of the first inlet vane 54.

The plurality of inlet turning vanes 40 further includes a fourth inlet vane 114 as shown in FIGS. 3 and 4. The fourth inlet vane 114 neighbors the third inlet vane 98 to locate the third inlet vane 98 directly between the fourth inlet vane 114 and the first inlet vane 54. In the illustrative embodiment, the fourth inlet vane 114 is the axially forwardmost vane of the plurality of inlet turning vanes 40 located in the vane frame 38 as shown in FIG. 3.

A trailing edge 124 of the fourth inlet vane 114 is formed as a continuous trailing edge 124 formed without notches. The continuous trailing edge 124 of the axially forwardmost fourth inlet vane 114 directs the air 15 into the heat exchanger 30, instead of in front of the heat exchanger 30, which might create a recirculation zone. The fourth inlet vane 114 has a fifth chord length C5 that is smaller than the fourth chord length C4 in the illustrative embodiment.

In some embodiments, the turning angle of the plurality of inlet turning vanes 40 is between 70 degrees and 75 degrees. In some embodiments, the plurality of inlet turning vanes 40 have a constant thickness throughout each of the plurality of inlet turning vanes 40 as suggested in FIGS. 6 and 7. In some embodiments, the plurality of inlet turning vanes 40 have an airfoil shape, and thus, do not have a constant thickness throughout each of the plurality of inlet turning vanes 40.

The inlet shroud 32 further includes a shroud housing 126 and a compliant joint 128 as shown in FIG. 3. The shroud housing 126 is coupled with the first side wall 42 and the second side wall 44, and the compliant joint 128 is coupled with the shroud housing 126.

In the illustrative embodiment, the plurality of inlet turning vanes 40 are made of sheet metal. The sheet metal provides a surface finish such that post processing the plurality of inlet turning vanes 40 is not performed in the illustrative embodiment. The first, second, and third notches 76, 96, 110 are formed via stamping. However, it will be understood that the first, second, and third notches 76, 96, 110 may be formed in any other appropriate manner. The first tab 64 of the first inlet vane 54 is inserted into the first slot 46 formed in the first side wall 42, and the second tab 66 of the first inlet vane 54 is inserted into the first slot 46 formed in the second side wall 44 of the vane frame 38. The first tab 64 and the second tab 66 are then brazed with the respective first slots 46. In an alternative embodiment, the first tab 64 and the second tab 66 are welded together with the respective first slots 46.

The third tab 84 of the second inlet vane 56 is inserted into the second slot 48 formed in the first side wall 42, and the fourth tab 86 of the second inlet vane 56 is inserted into the second slot 48 formed in the second side wall 44 of the vane frame 38. The third tab 84 and the fourth tab 86 are then brazed with the respective second slots 48. In an alternative embodiment, the third tab 84 and the fourth tab 86 are welded together with the respective second slots 48.

As previously discussed, to ensure the first, second, and third notches 76, 96, 110 are staggered within the vane frame 38, the first and second tabs 64, 66 of the first inlet vane 54 only fit into the first slots 46, while the third and fourth tabs 84, 86 of the second inlet vane 56 only fit into the second slots 48.

Figure 9:
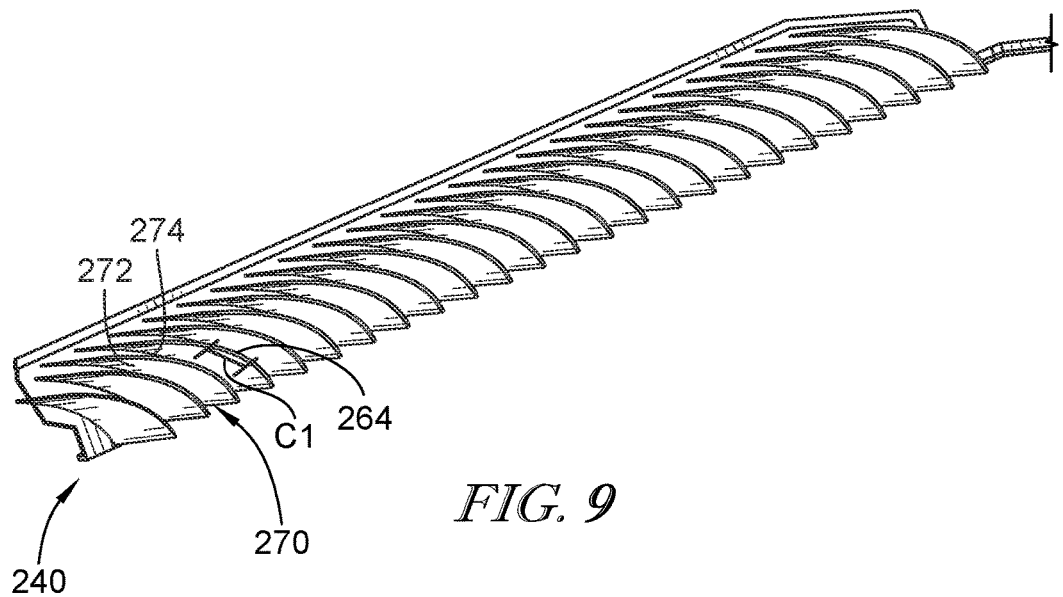
FIG. 9 is a perspective view of another embodiment of a plurality of inlet turning vanes, showing each of the plurality of inlet turning vanes has a leading edge and a trailing edge formed as a continuous trailing edge without notches.
Figure 10:
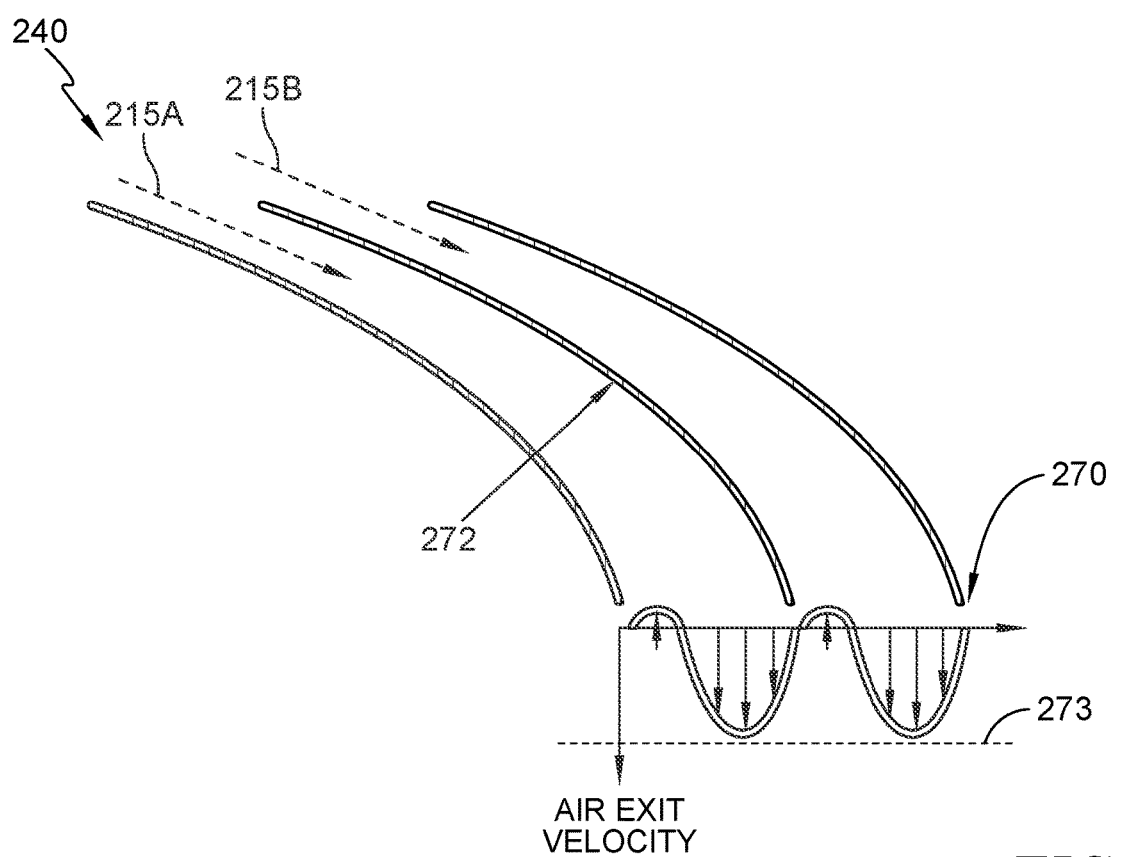
FIG. 10 is a velocity profile of the flow of air through the plurality of inlet turning vanes of FIG. 9, showing that the velocity profile of the flow of air exiting the inlet shroud and entering the heat exchanger includes high velocity peaks and areas of reverse flow in some embodiments.

Another embodiment of a plurality of inlet turning vanes 240 in accordance with the present disclosure is shown in FIGS. 9 and 10. The plurality of inlet turning vanes 240 are substantially similar to the plurality of inlet turning vanes 40 shown in FIGS. 3-8 and described herein. Accordingly, similar reference numbers in the 200 series indicate features that are common between the plurality of inlet turning vanes 40 and the plurality of inlet turning vanes 240. The description of the plurality of inlet turning vanes 40 is incorporated by reference to apply to the plurality of inlet turning vanes 240, except in instances when it conflicts with the specific description and the drawings of the plurality of inlet turning vanes 240.

The plurality of inlet turning vanes 240 are substantially the same as the plurality of inlet turning vanes 40 except each of the plurality of inlet turning vanes 240 include a trailing edge 270 formed as a continuous trailing edge without notches as shown in FIGS. 9 and 10. The continuous trailing edge vanes 240 may be easier to manufacture as compared to the inlet turning vanes 40 and provide similar benefits by turning and diffusing the flow of air 215.

The air 215 flows closely to a pressure side 272 of each of the plurality of inlet turning vanes 240 such that a velocity of the air 215 exiting near the pressure side 272 of each of the plurality of inlet turning vanes 240 is turned and reduces the pressure via diffusion. The air 215 exiting the inlet turning vanes 240 may have a relatively higher peak 273 and, thus, may have relatively lower uniformity as compared to the inlet turning vanes 40 as suggested in the velocity profile of FIG. 10. Depending on the specific flow characteristics in the bypass duct 20 and the flow and cooling characteristics desired from the heat-exchanger assembly 26, the manufacturing and assembly costs and time requirements of the vanes 240 may outweigh any relatively lower uniformity of the velocity profile of the vanes 240 as compared to the plurality of inlet turning vanes 40.

The plurality of inlet turning vanes 240 each include a tab 264 on each side of the vanes 240 as shown in FIG. 9. The tabs 264 of each of the plurality of inlet turning vanes 240 have the same chord length C1 in the illustrative embodiment because the plurality of inlet turning vanes 240 are all substantially similar and do not include alternating offset notches. In other embodiments, the chord length could be of a different length and/or the plurality of inlet turning vanes 240 could have varying chord lengths. In the illustrative embodiment, the axially forwardmost vane 240 has a smaller overall chord length from leading edge to trailing edge due to space claim and flow characteristics. Such forwardmost vane 240 may have tabs with a different chord length from the remaining vanes 240 to assist with assembly.

Figure 11:
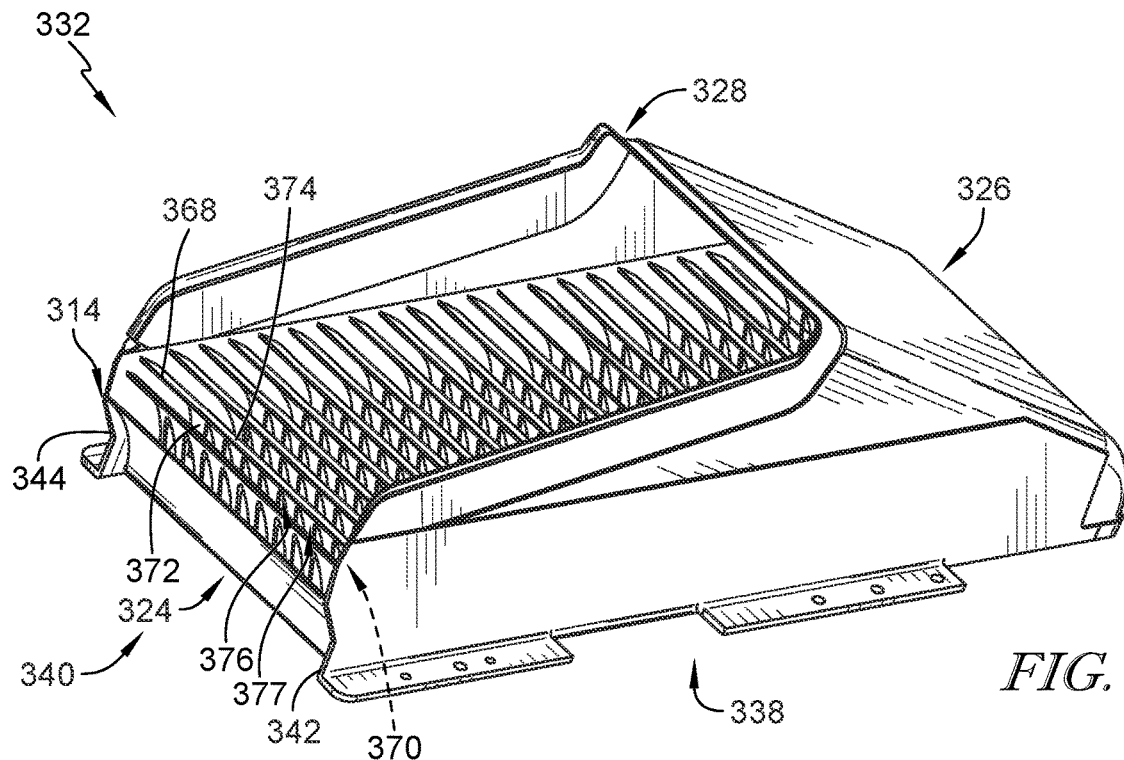
FIG. 11 is a perspective view of another embodiment of an inlet shroud, showing the inlet shroud includes a vane frame and a plurality of inlet turning vanes integrally formed with the vane frame and configured to adjust a direction of the flow of air.
Figure 12:
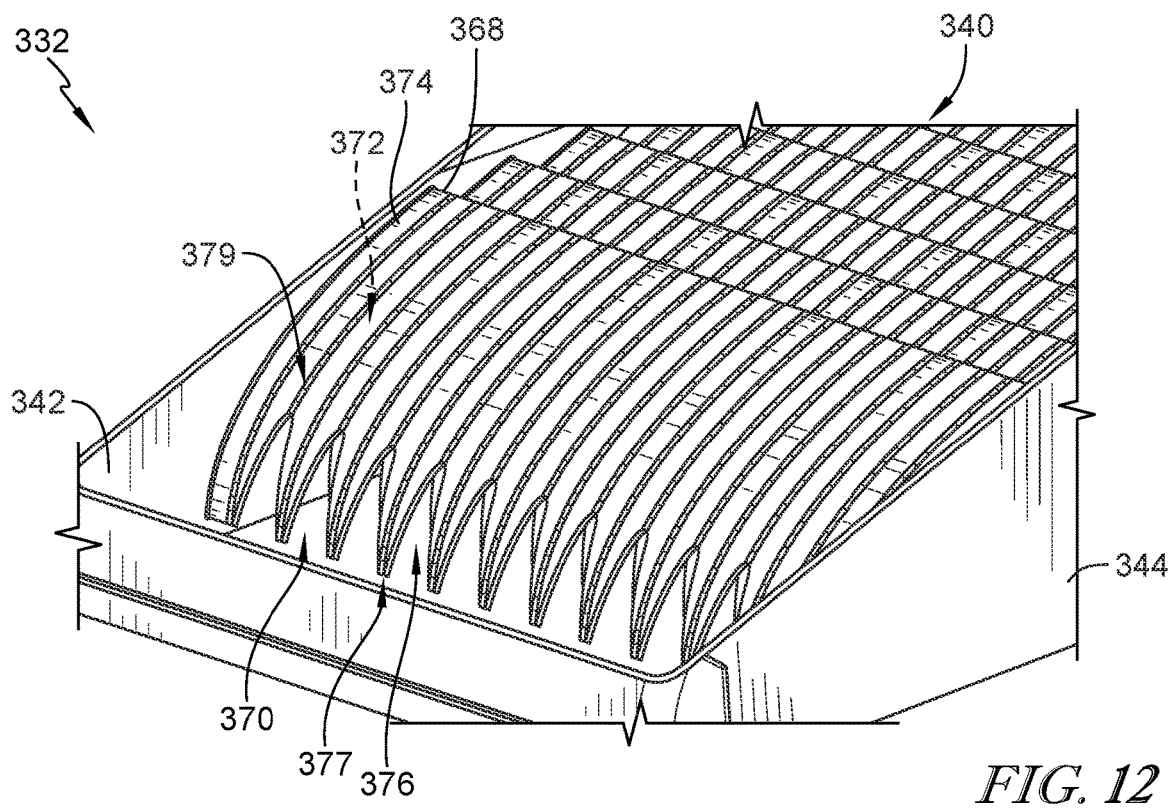
FIG. 12 is a rear view of the inlet shroud of FIG. 11, showing that each of the plurality of inlet turning vanes are formed to include a rib extending between a leading edge and a trailing edge opposite the leading edge.

Another embodiment of an inlet shroud 332 in accordance with the present disclosure is shown in FIGS. 11 and 12. The inlet shroud 332 is substantially similar to the inlet shroud 32 shown in FIGS. 3-8 and described herein. Accordingly, similar reference numbers in the 300 series indicate features that are common between the inlet shroud 32 and the inlet shroud 332. The description of the inlet shroud 32 is incorporated by reference to apply to the inlet shroud 332, except in instances when it conflicts with the specific description and the drawings of the inlet shroud 332.

The inlet shroud 332 is formed via additive manufacturing such that the inlet shroud 332 is integrally formed. In one embodiment, the inlet shroud 332 is formed as a single monolithic component via additive manufacturing. In another embodiment, additive manufacturing is used to make two pieces that are then welded or brazed together to form the inlet shroud 332. In another embodiment, additive manufacturing is used to make three pieces that are then welded or brazed together to form the inlet shroud 332.

The inlet shroud 332 includes a vane frame 338 and a plurality of inlet turning vanes 340 as shown in FIG. 11. The plurality of inlet turning vanes 340 are located within the vane frame 338 and are configured to adjust a direction of the portion of the air 15 entering the heat exchanger 30.

The vane frame 338 includes a first side wall 342 and a second side wall 344 spaced apart from and opposite the first side wall 342 as shown in FIG. 11. The vane frame 338 is coupled with the first wall 34 of the heat exchanger 30, such as the upstream surface of the first wall 34. The first side wall 342 and the second side wall 344 of the vane frame 338 are both formed without slots as shown in FIG. 11.

The plurality of inlet turning vanes 340 of the inlet shroud 332 are located in and coupled with the vane frame 338 as shown in FIG. 11. The plurality of inlet turning vanes 340 are formed without tabs. The plurality of inlet turning vanes 340 each include a leading edge 368, a trailing edge 370, a pressure side 372, and a suction side 374 as shown in FIG. 11. The pressure side 372 of each of the plurality of inlet turning vanes 340 extends between the leading edge 368 and the trailing edge 370. The suction side 374 extends between the leading edge 368 and the trailing edge 370 on an opposing side of each of the plurality of inlet turning vanes 340.

The trailing edge 370 of each of the plurality of inlet turning vanes 340 is formed to include notches 376 that extend into the trailing edge 370 of each of the plurality of inlet turning vanes 340 toward the leading edge 368 as shown in FIG. 11. The notches 376 increase uniformity of the velocity profile of the flow of air 15 exiting the inlet shroud 332 and entering the heat exchanger 30 as shown in FIG. 8. The trailing edge 370 of each of the plurality of inlet turning vanes 340 is further formed to include tips 377 that define the notches 376 as shown in FIG. 12. The notches 376 formed in the trailing edge 370 of each of the plurality of inlet turning vanes 340 are offset relative to the notches 376 formed in the trailing edge 370 of a neighboring vane of the plurality of inlet turning vanes 340.

The plurality of inlet turning vanes 340 are each formed to include ribs 379 as shown in FIG. 12. The ribs 379 extend on each of the plurality of inlet turning vanes 340 parallel to the flow of the air 15. The ribs 379 may provide stability and rigidity to the trailing edge 370 of each of the plurality of inlet turning vanes 340 as the tips 377 may vibrate. In the illustrative embodiment, the ribs 379 extend between the leading edge 368 and the trailing edge 370 of each of the plurality of inlet turning vanes 340. The ribs 379 are formed at each notch 376 and at each tip 377.

In alternative embodiments, the ribs 379 are formed at each notch 376 and are not formed at each tip 377. In alternative embodiments, the ribs 379 are formed at each tip 377 and are not formed at each notch 376. In some embodiments, the ribs 379 are formed on the pressure side 372 of each of the plurality of inlet turning vanes 340. In some embodiments, the ribs 379 are formed on the suction side 374 of each of the plurality of inlet turning vanes 340. In some embodiments, the ribs 379 are formed on the pressure side 372 and the suction side 374 of each of the plurality of inlet turning vanes 340. In some embodiments, the ribs 379 extend between the leading edge 368 and the trailing edge 370 of each of the plurality of inlet turning vanes 340 as shown in FIG. 12. In other embodiments, the ribs 379 extend only on the tips 377 such that the ribs 379 end where the notches 376 are formed. In alternative embodiments, the ribs 379 are formed along edges of the notches 376. The configuration and design of the ribs 379 on each of the plurality of inlet turning vanes 340 may be tailored to specific applications so as to prevent twisting and/or bending of the tips 377.

The inlet shroud 332 includes at least one inlet vane 314 having a trailing edge 324 formed as a continuous trailing edge 324 without notches as shown in FIG. 11. The at least one inlet vane 314 is the axially forwardmost vane of the plurality of inlet turning vanes 340 located in the vane frame 338 as shown in FIG. 11.

The inlet shroud 332 further includes a shroud housing 326 and a compliant joint 328 as shown in FIG. 11. The shroud housing 326 is coupled with the first side wall 342 and the second side wall 344, and the compliant joint 328 is coupled with the shroud housing 326.

A method of using the bypass duct 20 and the heat-exchanger assembly 26 with the plurality of inlet turning vanes 40 is described below. The method applies to all embodiments of the present disclosure, including assemblies with the plurality of inlet turning vanes 40, 240 and also the plurality of inlet turning vanes 340 where applicable. The method includes providing the bypass duct 20 configured to direct air 15 through the flow path 24. The method further includes providing and arranging the heat exchanger 30 in the bypass duct 20. The heat exchanger 30 is configured to receive a portion of the air 15 flowing through the flow path 24 of the bypass duct 20.

The method further includes arranging the inlet shroud 32 upstream of the heat exchanger 30 and coupling the inlet shroud 32 with the heat exchanger 30. The inlet shroud 32 includes the vane frame 38 and the plurality of inlet turning vanes 40. The plurality of inlet turning vanes 40 includes the first inlet vane 54 coupled with the vane frame 38 and the second inlet vane 56 coupled with the vane frame 38. The vane frame 38 has the first side wall 42 and the second side wall 44 spaced apart from and opposite the first side wall 42. The first side wall 42 and the second side wall 44 are both formed to include the first slot 46 and the second slot 48 neighboring the first slot 46.

The first inlet vane 54 has the leading edge 68, the trailing edge 70, the pressure side 72 extending between the leading edge 68 and the trailing edge 70, and the suction side 74 extending between the leading edge 68 and the trailing edge 70 on an opposing side of the first inlet vane 54. The trailing edge 70 of the first inlet vane 54 is formed to include first notches 76 that extend into the trailing edge 70 toward the leading edge 68.

The method further includes coupling the second inlet vane 56 having the leading edge 88 and the trailing edge 90 formed to include second notches 96 that extend into the trailing edge 90 toward the leading edge 88 adjacent the first inlet vane 54 in the vane frame 38. The second notches 96 of the second inlet vane 56 are offset relative to the first notches 76 of the first inlet vane 54 in a spanwise direction of the first inlet vane 54 and the second inlet vane 56.

The method further includes stamping the first notches 76 in the trailing edge 70 of the first inlet vane 54 formed of sheet metal and stamping the second notches 96 in the trailing edge 90 of the second inlet vane 56 formed of sheet metal. The method further includes inserting the first tab 64 extending from the first end 60 of the first inlet vane 54 into the first slot 46 of the first side wall 42. The method further includes inserting the second tab 66 extending from the second end 62 of the first inlet vane 54 into the first slot 46 of the second side wall 44.

The method further includes inserting the third tab 84 extending from the first end 80 of the second inlet vane 56 into the second slot 48 of the first side wall 42. The method further includes inserting the fourth tab 86 extending from the second end 82 of the second inlet vane 56 into the second slot 48 of the second side wall 44.

The method further includes brazing the first tab 64 of the first inlet vane 54 with the first slot 46 of the first side wall 42, brazing the second tab 66 of the first inlet vane 54 with the first slot 46 of the second side wall 44, brazing the third tab 84 of the second inlet vane 56 with the second slot 48 of the first side wall 42, and brazing the fourth tab 86 of the second inlet vane 56 with the second slot 48 of the second side wall 44.

The method further includes coupling the fourth inlet vane 114 having the leading edge and the continuous trailing edge 124 formed without notches adjacent the first inlet vane 54 to locate the first inlet vane 54 between the second inlet vane 56 and the fourth inlet vane 114.

The method further includes directing the flow of air 15 through the inlet shroud 32. The method further includes directing a first part 15A of the air 15 along the pressure side 72 of the first inlet vane 54. The method further includes conducting a portion 15C of the first part 15A of the air 15 through the first notches 76 formed on the trailing edge 70 of the first inlet vane 54. The method further includes mixing the portion 15C of the first part 15A of the air 15 with the second part 15B of the air 15 flowing along the suction side 74 of the first inlet vane 54. The method further includes adjusting a direction of the flow of the air 15 via the plurality of inlet turning vanes 40 before the air 15 enters the heat exchanger 30.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A gas turbine engine comprising:
   a heat exchanger configured to transfer heat from a cooling fluid passing through the heat exchanger to a flow of air received by the heat exchanger, and
   an inlet shroud configured to be coupled with the heat exchanger upstream of the heat exchanger, the inlet shroud including a vane frame and a plurality of inlet turning vanes coupled with the vane frame and configured to direct the flow of air into the heat exchanger, the vane frame having a first side wall and a second side wall spaced apart from and opposite the first side wall, the first side wall and the second side wall are both formed to include a first slot having a first chord length and a second slot neighboring the first slot and having a second chord length different from the first chord length, and the plurality of inlet turning vanes located in the vane frame and configured to adjust a direction of the flow of air before the flow of air enters the heat exchanger,
   wherein the plurality of inlet turning vanes includes a first inlet vane and a second inlet vane, the first inlet vane including a first airfoil body having a third chord length, a first tab extending from a first end of the first airfoil body and into the first slot of the first side wall, and a second tab extending from a second end of the first airfoil body and into the first slot of the second side wall, and the second inlet vane including a second airfoil body having the third chord length, a third tab extending from a first end of the second airfoil body and into the second slot of the first side wall, and a fourth tab extending from a second end of the second airfoil body and into the second slot of the second side wall.

2. The gas turbine engine of claim 1, wherein the first inlet vane has a leading edge and a trailing edge formed to include first notches that extend into the trailing edge of the first inlet vane toward the leading edge of the first inlet vane to increase uniformity of a velocity profile of the flow of air exiting the inlet shroud and entering the heat exchanger.

3. The gas turbine engine of claim 2, wherein the second inlet vane has a leading edge and a trailing edge formed to include second notches that extend into the trailing edge of the second inlet vane toward the leading edge of the second inlet vane, and wherein the second notches of the second inlet vane are offset relative to the first notches of the first inlet vane in a spanwise direction of the first inlet vane and the second inlet vane.

4. The gas turbine engine of claim 2, wherein the first notches of the first inlet vane are chevron shaped.

5. The gas turbine engine of claim 1, wherein the plurality of inlet turning vanes includes a third inlet vane having a fourth chord length that is less than the third chord length, and the third inlet vane neighbors the first inlet vane to locate the first inlet vane directly between the third inlet vane and the second inlet vane.

6. The gas turbine engine of claim 5, wherein the third inlet vane has a leading edge and a trailing edge formed to include third notches that extend into the trailing edge of the third inlet vane toward the leading edge of the third inlet vane, and wherein the third notches of the third inlet vane are offset relative to the first notches of the first inlet vane in a spanwise direction of the first inlet vane and the third inlet vane, and the third inlet vane includes a third airfoil body having a first end coupled to the first side wall and a second end coupled to the second side wall.

7. The gas turbine engine of claim 6, wherein the plurality of inlet turning vanes includes a fourth inlet vane having a leading edge and a continuous trailing edge formed without notches, and wherein the fourth inlet vane includes a fourth airfoil body having a first end coupled to the first side wall and a second end coupled to the second side wall.

8. The gas turbine engine of claim 1, wherein the plurality of inlet turning vanes includes a third inlet vane having a leading edge and a continuous trailing edge formed without notches, and wherein the third inlet vane includes a third airfoil body having a first end coupled to the first side wall and a second end coupled to the second side wall.

9. The gas turbine engine of claim 8, wherein the third inlet vane is the axially forwardmost vane of the plurality of inlet turning vanes.

10. A gas turbine engine comprising:
a heat exchanger configured to transfer heat from a cooling fluid passing through the heat exchanger to a flow of air received by the heat exchanger, and
an inlet shroud configured to be coupled with the heat exchanger upstream of the heat exchanger, the inlet shroud including a vane frame and a plurality of inlet turning vanes coupled with the vane frame and configured to direct the flow of air into the heat exchanger, the vane frame having a first side wall and a second side wall spaced apart from and opposite the first side wall, and the plurality of inlet turning vanes located in the vane frame and configured to adjust a direction of the flow of air before the flow of air enters the heat exchanger,
wherein the plurality of inlet turning vanes includes a first inlet vane and a second inlet vane, the first inlet vane including a first airfoil body having a first chord length, a first end of the first airfoil body coupled to the first side wall, and a second end of the first airfoil body coupled to the second side wall, and the second inlet vane including a second airfoil body having the first chord length, a first end of the second airfoil body coupled to the first side wall, and a second end of the second airfoil body coupled to the second side wall,
wherein the first side wall and the second side wall of the vane frame are both formed to include a first slot having a second chord length and a second slot neighboring the first slot and having a third chord length different from the second chord length.

11. The gas turbine engine of claim 10, wherein the first inlet vane has a leading edge and a trailing edge formed to include first notches that extend into the trailing edge of the first inlet vane toward the leading edge of the first inlet vane to increase uniformity of a velocity profile of the flow of air exiting the inlet shroud and entering the heat exchanger.

12. The gas turbine engine of claim 11, wherein the second inlet vane has a leading edge and a trailing edge formed to include second notches that extend into the trailing edge of the second inlet vane toward the leading edge of the second inlet vane, and wherein the second notches of the second inlet vane are offset relative to the first notches of the first inlet vane in a spanwise direction of the first inlet vane and the second inlet vane.

13. The gas turbine engine of claim 11, wherein the first notches of the first inlet vane are chevron shaped.

14. The gas turbine engine of claim 11, wherein the plurality of inlet turning vanes includes a third inlet vane having a fourth chord length that is less than the first chord length, and the third inlet vane neighbors the first inlet vane to locate the first inlet vane directly between the third inlet vane and the second inlet vane.

15. The gas turbine engine of claim 14, wherein the third inlet vane has a leading edge and a trailing edge formed to include third notches that extend into the trailing edge of the third inlet vane toward the leading edge of the third inlet vane, and wherein the third notches of the third inlet vane are offset relative to the first notches of the first inlet vane in a spanwise direction of the first inlet vane and the third inlet vane, and the third inlet vane includes a third airfoil body having a first end coupled to the first side wall and a second end coupled to the second side wall.

16. The gas turbine engine of claim 15, wherein the plurality of inlet turning vanes includes a fourth inlet vane having a leading edge and a continuous trailing edge formed without notches, and wherein the fourth inlet vane includes a fourth airfoil body having a first end coupled to the first side wall and a second end coupled to the second side wall.

17. The gas turbine engine of claim 10, wherein the first end of the first airfoil body of the first inlet vane is formed to include a first tab extending from the first end into the first slot of the first side wall, the second end of the first airfoil body of the first inlet vane is formed to include a second tab extending from the second end into the first slot of the second side wall, the first end of the second airfoil body of the second inlet vane is formed to include a third tab extending from the first end into the second slot of the first side wall, and the second end of the second airfoil body of the second inlet vane is formed to include a fourth tab extending from the second end into the second slot of the second side wall.

18. A method comprising:
providing a heat exchanger,
arranging an inlet shroud upstream of the heat exchanger, the inlet shroud including a vane frame and a plurality of inlet turning vanes including a first inlet vane and a second inlet vane, the vane frame having a first side wall and a second side wall spaced apart from and opposite the first side wall, the first side wall and the second side wall both formed to include a first slot having a first chord length and a second slot neighboring the first slot and having a second chord length different from the first chord length,
inserting a first tab extending from a first end of the first inlet vane into the first slot of the first side wall,
inserting a second tab extending from a second end of the first inlet vane into the first slot of the second side wall, inserting a third tab extending from a first end of the second inlet vane into the second slot of the first side wall, inserting a fourth tab extending from a second end of the second inlet vane into the second slot of the second side wall, directing a flow of air through the inlet shroud, and adjusting a direction of the flow of air via the plurality of inlet turning vanes before the flow of air enters the heat exchanger.

19. The method of claim 18, further including stamping first notches in a trailing edge of the first inlet vane formed of sheet metal and stamping second notches in a trailing edge of the second inlet vane formed of sheet metal.

20. The method of claim 19, further including brazing the first tab of the first inlet vane with the first slot of the first side wall, brazing the second tab of the first inlet vane with the first slot of the second side wall, brazing the third tab of the second inlet vane with the second slot of the first side wall, and brazing the fourth tab of the second inlet vane with the second slot of the second side wall.

\* \* \* \* \*